April 2, 1968     C. A. RODMAN     3,375,933
SEMI-RIGID POLYMER ENCAPSULATED FILTER MEDIUM CONTAINING
AN UNENCAPSULATED ADSORBENT MATERIAL Filed Feb. 1, 1965     2 Sheets-Sheet 1

SINTERED BLEND OF POLYMER
ENCAPSULATED SOLID AND
ADSORBENT SUBSTANCE

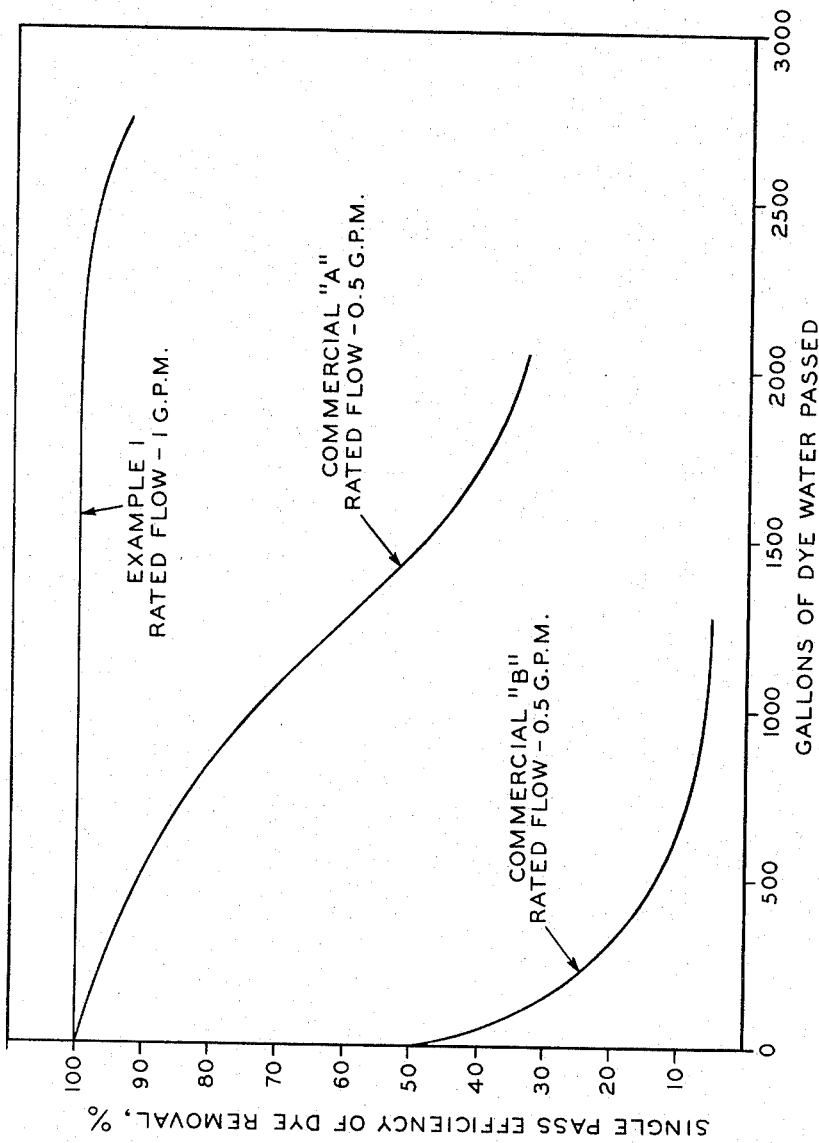

United States Patent Office 3,375,933
Patented Apr. 2, 1968

3,375,933
SEMI-RIGID POLYMER ENCAPSULATED FILTER MEDIUM CONTAINING AN UNENCAPSULATED ADSORBENT MATERIAL
Clarke A. Rodman, Riverside, R.I., assignor to Fram Corporation, Providence, R.I., a corporation of Rhode Island
Filed Feb. 1, 1965, Ser. No. 429,215
1 Claim. (Cl. 210—502)

ABSTRACT OF THE DISCLOSURE

Adsorption filter for removing dissolved impurities from fluid. Unencapsulated absorbent particles (e.g., activated carbon) are supported in a semi-rigid matrix formed of a sintered mass of solids encased in thermoplastic polymer casings, said encased solids being attached to each other by thermoplastic bonds between the casings to form the semi-rigid matrix.

---

The present invention relates to filter media and particularly to fixed bed media for filtering fluids. The filter media of the invention are formed of intimate heterogeneous mixtures which media are sufficiently rigid to retain their original shape and yet avoid compaction during use.

More specifically, the invention resides in filter media for liquids and gases which media are comprised of a sintered mixture of a free-flowing powder of polymer encased or encapsulated individual discrete particles of a finely-divided solid with a finely-divided absorbent, ion exchanger, or filter aid. The filter media of the invention have excellent filtering properties, a long filtering life, permit rapid flow of fluid through the media with a low pressure drop across the filter media.

The rapid-flow property of the filter media is particularly important since it is not only possessed by the media when freshly formed, but it is retained over long periods of usage in filtration operations. This retention of the free-flow property is a unique characteristic of the filter media of the invention. It is made possible by virtue of the fact that these filter media resist compaction of the mass during usage. This resistance to compaction of the filter media results from the semi-rigid structure of the matrix formed upon sintering the mixture of polymer encased or encapsulated solids and the finely-divided adsorbent substance. The matrix consists of the polymer encased solid. It is desirable to employ polymer encapsulate material which is non-volatile and which will not affect the adsorption or chemical proprties of the adsorbent, ion exchanger, or filter aid.

Another important property of the filter media of the invention is the efficient and effective filtration of fluids which it provides at high rates of the fluid flow and the effective removal of impurities made possible per unit of weight of adsobent, ion exchanger, or filter aid present in the media. The filter media of the invention provide for the removal of greater amounts of dissolved impurities from a fluid per unit of adsorbent substance, such as activated carbon.

It has been proposed heretofore and in presently marketed filter media to pack a container or cartridge with loose powder or granules of adsorbent, ion exchanger, or filter aid, such as activated carbon. In such a filter, the fluid, such as a liquid, is permitted to flow or percolate through the mass of adsorbent, ion exchanger, or filter aid. This packing of loose filter aid may permit rapid flow of the fluid at first, but after very little usage in filtration the particles of filter aid tend to settle and pack in the cartridge, thereby forming a more compact mass. Under these conditions of compaction the pressure drop across the filter is greatly increased and there is also danger of channeling of liquid passing through the filter which would drastically reduce the filter's efficiency. Consequently, the useful life of the filter is greatly reduced. One of the contributing causes of the shortened life of these prior art filters is that as a result of the compaction of the mass, a substantial portion of the filter aid is no longer made accessive to the fluid flowing through the mass. This results from the channeling of the fluid in the mass and the reduced apparent surface of filter aid exposed to the fluid soon becomes exhausted.

Efforts have been made to overcome these difficulties encountered in the loosely packed filters and to prevent compaction of the filter aid during use. One result of such efforts has been to employ larger granules of the adsorbent, ion exchanger, or filter aid instead of the finely-divided forms. These loosely packed large granules of adsorbent, ion exchanger, or filter aid are less prone to compact during use than the finely-divided forms, but they possess other serious disadvantages. Being much larger particles they possess much less apparent surface area, thereby drastically reducing the instantaneous adsorbent capacity per unit of weight of the filter aid or adsorbent substance. Since they possess much lower instantaneous efficiencies for removing impurities from fluids, it therefore becomes necessary to pass the fluid through a longer bed of filter aid to provide satisfactory purification of the fluid.

It is therefore an object of the present invention to overcome the shortcomings of prior art adsorption filter media.

It is another object of the invention to provide filter media which permit rapid flow of fluids through them over longer periods of usage in filtration operations, which media resist compaction during usage, and which provide highly efficient removal of dissolved impurities from fluids per unit of weight of adsorbent, ion exchanger, or filter aid.

It is a further object of the present invention to provide filter media for fluids which media are comprised of a sintered mixture of a free-flowing powder of polymer encased or encapsulated individual particles of a finely-divided solid with a finely-divided adsorbent, ion exchanger, or filter aid.

The novel filter medium of the invention thus comprises a sintered mass of solids encased in thermoplastic polymer casings, the encased solids being attached to each other by portions of their casings to form a semi-rigid matrix, with finely divided particles of adsorbent material distributed throughout the mass and mechanically supported by the matrix between the polymer encased solids, the particles of adsorbent material being unencapsulated.

Other objects of the invention will be apparent to those skilled in the filter art from reading the present specification, taken in conjunction with the accompanying drawings, in which:

FIG. 4 is a graph comprising the life characteristics and filtering efficiency of a filter employing the medium of Example 1 with two presently available commercial filters.

Figure 1:
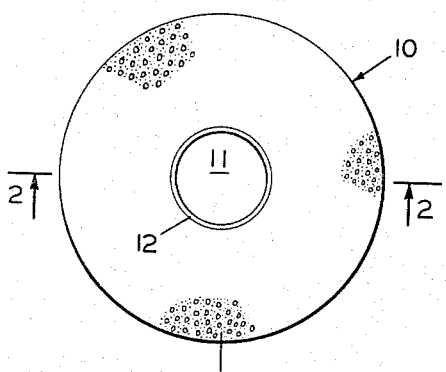
FIG. 1 is a top plan view with portions cut away of a substantially rigid filter medium produced in accordance with the present invention, showing the sintered blend of adsorbent substance and polymer encapsulated solid.

The benefits of the present invention are achieved by means of a sintered unitary mass comprising a matrix of polymer encapsulated or encased solid holding between the solids unencapsulated particles of a finely divided adsorbent, ion exchanger, or filter aid. The adsorbent, ion exchanger, or filter aid is a substance which is normally free-flowing and which if employed alone in a filter unit would compact and tend to restrict the flow of fluid through the mass. The polymer encapsulated solid is one which prior to sintering is normally also free-flowing and which per se does not impart any adsorbtion property to the filter mass. When sintered, the thermoplastic polymer encapsulated particles sinter together sufficiently to form a semi-rigid framework or matrix about the particles of adsorbent, ion exchanger, or filter aid. The sintered mass is compacted insufficiently to inhibit seriously the flow of fluid through the mass.

The filter media of the invention can be produced by first blending free-flowing thermoplastic polymer encapsulated solid particles and a finely-divided adsorbent, ion exchanger, or filter aid in the desired proportions. The blend is then placed in or extruded into a chamber, form or mold of a shape which it is desired to have the filter media assume. The mass is then subjected to sufficient heat to cause the thermoplastic polymer casings to sinter slightly and to become attached to one another thereby forming the highly important matrix which locks the particles of adsorbent, ion exchanger, or filter aid into place and provides the unitary filter medium. The filter medium will assume the shape of the chamber, form or mold in which the mass is placed prior to the sintering operation. The shape of the filter medium is not critical and may vary according to use to which the filter medium is to be subjected.

The sintering operation is readily accomplished by subjecting the blend of thermoplastic polymer encapsulated solid and adsorbent substance in the form to the action of heat. Temperatures of 300° F. and above are usually sufficient, with the desired temperature depending somewhat upon the nature of and the molecular weight of the thermoplastic polymer encapsulation. The higher molecular weight polyolefins, for example, will permit the use of higher temperatures. With polyethylene encapsulated solids the temperature of 300° F. is usually suitable. It is desirable to employ a non-oxygenous atmosphere, such as nitrogen, or hydrogen, or high pressure steam so as to prevent combustion of the polyolefin during sintering. It has been found desirable to add an antioxidant to the blended mass prior to sintering so as to prevent the possibility of combustion during sintering. One suitable antioxidant is Santonox (containing as the active ingredient, 4,4'bis[3-methyl-6-tertiary butyl phenol]), in an amount of about 0.5% by weight of the polyolefin encapsulated component. Satisfactory results have been obtained with the anti-oxidant treated polyolefin encapsulated component in hot air up to 450° F. without combustion. It has also been found that the use of a perforated mold to flow heated air, inert gas, or high pressure steam through the bed accelerates the bonding or sintering rate.

The sintering operation can provide various degrees of compaction of the filter medium. The higher the temperature, the longer the duration of the sintering time and the greater the pressure applied to the mass, the greater will be the compaction of the mass, including the sintered matrix of polymeric encapsulated particles. The greater the compaction of the mass during sintering, the lower will be the permeability of the filter medium and the lower the rate of flow of fluid through the filter during filtration. For some types of filtration a more compact filter medium is desirable, but since most filtering operations require maximum flow rate, it is usually preferred to sinter and compact the mass as little as possible. In such cases it is desirable to sinter the mass sufficiently to form only a matrix of polymer encapsulated particles which will hold the medium together and prevent settling and motility of the particles of finely-divided adsorbent, ion exchanger, or filter aid during filtering operations.

It is also possible to extrude and sinter in place a rigid porous fixed bed shape or article by preheating the blend of encapsulated material and adsorbent, ion exchanger, or filter aid by means of a hot gas fluidized bed within at most 5° F. below the stick point of the polymer encapsulate, screw feeding the preheated mixture into a heated mold die held at a temperature sufficient to sinter the polymer encapsulate and then through a cold mold die to set the bonded structure.

As will be apparent from the foregoing, where maximum rate of flow of fluid is desired through the filter, the sintering treatment should be no more than moderate. Excessive temperature, time or pressure will all contribute to excessive compaction and if the conditions of sintering are severe enough, the mass will sinter and compact to a degree that it may become substantially impervious to the flow of fluids. For most uses it is desirable that filter medium permit a flow of air of at least about 0.2 to 3 cu. ft. per minute when subjected to a pressure head of 0.5 inch of water.

The nature of the polymer encapsulating the solid particles of the encapsulate component may vary depending upon the nature of the fluid to be filtered. The selection of the polymer to be employed should be governed by the requirement that the polymer must not be subject to undue decomposition during the thermal sintering operation in which the filter is formed. The polymer should be thermoplastic so as to sinter at reasonable temperatures, should be non-volatile in nature and should not affect the adsorption or chemical properties of the adsorbent, ion exchanger, or filter aid. It should not be dissolved or decomposed by the fluid which is to be filtered. Among the polymers which may be employed are the polyamides, such as nylon; the polyesters, such as terylene; the vinyls, such as polyvinyl chloride; the acrylics, such as polymethylmethacrylate. For most uses the polyolefins, such as polyethylene and polypropylene, have been found to be most useful and are preferred for most applications.

The preferred polyolefin encapsulated solid component of filter media of the invention is desirably of the type sold by National Lead Company under the trademark Nalcon. These materials are normally free-flowing powders of individual particles, each particle being encased or encapsulated in a shell of a polymer of an aliphatic 1-olefin monomer containing less than 6 carbon atoms, such as ethylene, propylene, butene-1, and the like. The encased solid particles may be of almost any nature provided that it is possible to encase them in polyolefin. Desirably the encased particles are short fibers, such as cellulose fibers, including kraft fibers, cotton fibers and linters, shredded wood, wood pulp fibers and the like, wool fibers, steel or metal wool fibers, glass or asbestos fibers, etc. Also the encased particles may be non-fibrous particles, such as metal powder particles, including aluminum and copper powder particles, non-metallic particles, such as carbon particles, particles of silicates, such as sodium or calcium silicates, etc., titanium dioxide, and the like.

While the polymer encapsulated particles may be fibrous or non-fibrous, it is preferred that the particles be fibrous in nature since they seem to provide superior results. Fibrous materials may be characterized as having a length at least about 5 times the thickness, with a preferred length of at least 50 to 100 microns up to about 0.5 inch or more.

Among the preferred polyolefin encapsulated materials which may be employed are those described in Orsino et al. U.S. Patent No. 3,121,698, granted Feb. 18, 1964, Orsino et al. Canadian Patent No. 678,341, granted Jan. 21, 1964, and Belgian Patents Nos. 575,559; 578,868; 580,554; 594,911; 601,734 and 601,325. It is intended to incorporate by reference the disclosures of these patents in their entireties.

The adsorbent, ion exchanger, or filter aid component of the filter media are finely-divided materials which are well known in the filtration art. These substances are capable of removing dissolved and/or colloidally dispersed substances from a fluid by several phenomena, including chemical attraction or reaction, physical attraction or mass action. Included among these well-known materials are ion exchange resins, such as sulfonated or carboxylated styrene and divinyl benzene copolymers, quaternary ammonium alkyl substituted styrene and divinyl benzene copolymers, powdered zeolite (both natural and synthetic) and the like, diatomaceous earth, activated carbon, activated alumina, activated silica gel, Fuller's earth, montmorillonite, bentonite and surface active clays in general, the "molecular sieves" etc. Mixtures of these substances may be employed. The substance selected will, of course, depend upon the nature of the impurity to be removed from the fluid.

In Table I below are listed some of the adsorbent, ion exchanger, or filter aids which may be selected for removal of various dissolved impurities from various fluids.

TABLE I

| Fluid to be purified | Function of Filter Aid | Adsorbent, Ion Exchanger, or Filter Aid |
| --- | --- | --- |
| Water | Purification and removal of dissolved gases and taste producing substances. | Activated carbon. |
| Water | Removal of dissolved minerals. | Ion exchange resin. |
| Dry cleaning fluid | Decolorization and removal of odors, grease and soaps. | Activated carbon. |
| Hydrocarbon fuels and organic solvents. | Removal of surfacants and dissolved organic contaminants. | Do. |
| Water or organic solvents. | Removal of colloidal contaminants in colloid suspension. | Diatomaceous earths, Fuller's earth or activated alumina. |
| Air or gases | Removal of unwanted gases in solution or suspended liquids. | Activated carbon, molecular sieves, silica gel. |
| Organic solvents or gases. | Removal of dissolved water. | Silica gel, activated alumina or molecular sieves. |

It is also contemplated that a mixture of filter aids, ion exchangers or adsorbents may be employed in the same filter medium. Thus, for example, it is frequently desirable to employ both activated carbon and an ion exchange resin in the same filter medium.

The particles of filter aid, adsorbent, or ion exchanger component may vary over a wide range of average particle sizes. Of course, the larger the particle size, the lower is the apparent surface area per unit of weight of the substance. As has been explained hereinabove, one of the difficulties with prior art filter media is the need to employ adsorbent substance in the form of large granules if compaction and restriction of fluid flow is to be counteracted. One of the important advantages of the present invention is that the adsorbent substance can be in finely-divided form and, therefore, of small particle size. Consequently, a large apparent surface area of adsorbent is exposed for filtration purposes. This means that a more effective and efficient use may be made for each unit of weight of adsorbent substance. Thus particles having an average particle size of less than 100 mesh (U.S. Standard Sieve Series) may be employed. In fact, it is usually preferred to employ particles small enough to pass through a 300 mesh screen, or smaller. The use of pulverized powders has been found to be particularly effective and efficient.

The proportions of polymer encapsulated solid and the adsorbent, ion exchanger, or filter aid employed may vary widely. It has been found desirable for optimum efficiency in my novel filter media to employ as little as possible of the polymer encapsulated moiety, since it performs little or no role in removing impurities dissolved in the fluid being filtered. The role of the polymer encapsulated moiety is to provide, after sintering, a framework or matrix which holds the adsorbent substance in place and yet prevents compaction of the filter medium during usage. It is preferred to employ at least about 25% by weight of the polymer encapsulated substance, based on total weight of the medium, in order to insure sufficient bonding of the mass upon sintering. When amounts in excess of 90% by weight of polymer encapsulated solid are employed, the efficiency of the filter medium is reduced, since this matrix component contributes little to the removal of dissolved solids.

The preferred proportions of polymer encapsulated component in the filter medium will depend to some extent upon the amount of polymer encapsulated about the individual solid particles. With larger amounts of polymer encapsulation, it is normally possible to employ smaller proportions of the encapsulated solid. However, it is desirable to employ encapsulated particles consisting of not in excess of 75% by weight of polymer, since larger amounts tend to produce shrinkage and distortion of the media during the sintering treatment. For best results it is preferred to employ an encapsulated moiety containing at least about 50% by weight of polymer.

The use of polymer encapsulated solids in filter media of the invention is important. In addition to providing the matrix which prevents compaction during use, it provides for mechanical filtration and removal of suspended solids from the fluid. If particles of polymer above (without encapsulation in a solid) are employed, the rigidity and freedom from compaction would not be obtained. The presence of the encapsulated solid particles is necessary to survive the sintering treatment. Even after sintering the polymer remains encapsulated about the solid particle without coating the adsorbent, ion exchanger, or filter aid. To provide this property it is particularly desirable to employ encapsulated solids in which the solid is in the form of a fiber. The polyolefin encapsulation is particularly preferred because of its unique inertness to most fluids to be filtered.

Filter media of the invention may be formed in various shapes and sizes depending upon the volume and nature of fluid to be filtered. One suitable shape is that illustrated by the drawings, but other configurations may be employed with satisfactory results.

In order more clearly to disclose the nature of the present invention, the following examples illustrating the invention are provided. It should be understood, however, that this is done solely by way of example and is intended neither to delineate the scope of the invention nor limit the ambit of the appended claims. Unless otherwise stated, "parts" and percentages are intended to refer to parts by weight or percent by weight.

*Example 1*

The filter medium of this example will be described in conjunction with the accompanying drawings.

Figure 2:
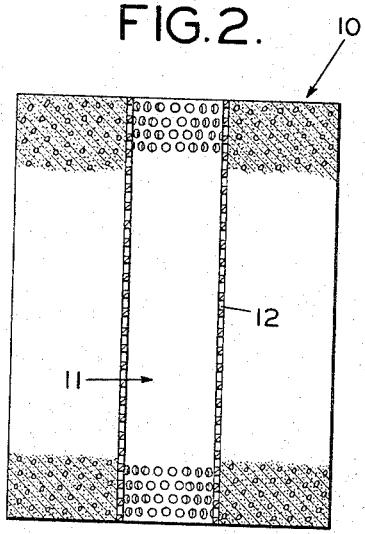
FIG. 2 is a perspective side view of the filter medium of FIG. 1, with portions cut away.
Figure 3:
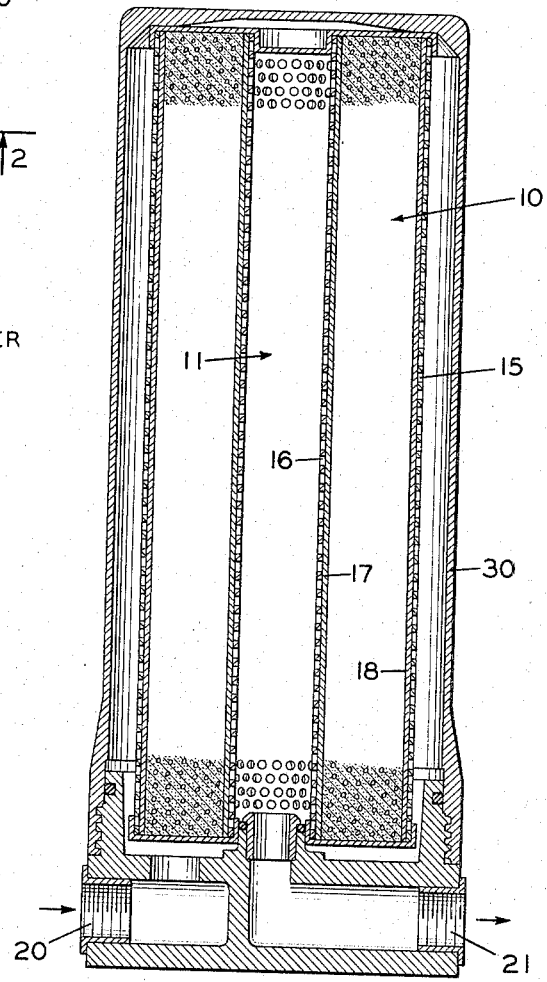
FIG. 3 is a vertical partial sectional view through a filter employing the filter medium of FIGS. 1 and 2 and Example 1, showing portions of the contents of the filter medium.

A mixture was prepared of 408 grams of activated carbon of an average particle size of less than 1000 mesh and 204 grams of Nalcon (comprising individual fibers of Solka Floc, ground purified paper pulp, encapsulated with polyethylene in an amount of 75% by weight of the encapsulated product, produced in accordance with Orsino et al. Patent No. 3,121,698) and which had been treated with one gram of Santonox antioxidant. Enough of the resulting blend was then placed in a mold having a cavity registering with the shape of the filter unit shown in FIGS. 1, 2 or 3 to fill the mold. Usually, this mold will only take 585 grams of blend to fill it. The mold and its contents were placed in a mechanical convection oven and the mold was heated at 400 to 450° F. for about 1.5 hours. The mold was cooled to room temperature, opened and the filter medium removed. The medium had the form shown in FIGS. 1, 2 or 3 of the drawings, in which numeral 10 designates in its entirety the molded depth type of filter medium. The medium is of cylindrical shape and has a central bore 11. As shown in FIGS. 2 and 3 it may be provided with a perforated center tube, such as indicated by 12 and 16, respectively.

A preferred embodiment of a fluid filter employing the filter medium of the invention is illustrated by FIG. 3.

In this unit the substantially rigid filter medium 10 is placed in the filter housing 15, with the medium fitting over the perforated center tube 16, and having interposed between the medium 10 and the center tube 16 an inner wrap 17 consisting of a sheet of micro glass fibers and Dacron (polyester) paper having a filtration rating of less than 1 micron. Interposed between the housing 15 and the medium 10 is an outerwrap 18 consisting of a sheet of Vinyon, Dacron and fine glass fibers. The entire unit is contained within the shell 30. The unit is equipped with inlet 20 and outlet 21.

The filter medium of the foregoing example employed in the filter described hereinabove in conjunction with FIG. 3 was then tested to compare its filtering properties with two currently available commercial filters of the prior art. Both of these commercial filters employed the typical packings of loose coarse granular activated particles in a percolation treatment. In Table II below are listed the dimensions of the filter media.

tained per gram of activated carbon. The filter medium of Example 1 provided approximately 3.5 times the efficiency of the best of the two commercial filters.

*Example 2*

An experimental filter medium comprising a plug 1⅝″ diameter 1 inch long was fabricated out of an intimate blend of 9 grams of micro powdered mixed bed ion exchange resin comprising 59% by wt. Rohm & Haas Amberlite XE–59 an anion exchange resin in the free base form of particle size smaller than 325 mesh and 41% by wt. Rohm & Haas Amberlite XE–97 a cation exchange resin in the hydrogen form of particle size smaller than 325 mesh and 3 grams of polyethylene encapsulated paper pulp of the same composition as described in Example 1. The polyethylene encapsulated paper pulp and rest of the mix were heat molded at 300° F. for 45 minutes in a glass funnel test fixture previously coated with a Hycar adhesive. A special test water comprising 0.2265 gram calcium chloride ($CaCl_2$), 0.183 grams magnesium chloride

TABLE II

| | Example 1 | Commercial "A" | Commercial "B" |
|---|---|---|---|
| Filter bed dimensions | 3.5 in. outside diameter, 1.2 in. inside diameter, 12 in. long. | 3.0 in. outside diameter, 1.0 in. inside diameter, 7 in. long. | 3.0 in. outside diameter, 1.5 in. inside diameter, 3.5 in. long. |
| Flow pattern | Radial | End to end | Radial. |
| Depth of pass | 1.19 inches | 7 inches | 0.56 inches. |
| Grams of activated carbon and mesh size. | 390, less than 325 mesh | 258, 12–30 mesh | 93, 8–12 mesh. |

Test water containing methylene blue was passed through each of the three filters to test the ability of the filters to remove the dye from the water and the drop in liquid flow rate observed during the test. The treatment of each filter was identical. The test employed was an adaptation of the method described in "Active Carbon" by Hassler, pp. 340–343, Chemical Publishing Co., Inc., New York (1951). In the course of the test fresh methylene blue was added to the test water at the rate of 5 cc. per minute of a solution containing 2.5 gms. of methylene blue per liter.

A comparison of the test results is shown in Table III below:

($MgCl_2 \cdot 6H_2O$) and 3000 grams of demineralized water was reservoir fed to the test fixture under various air pressure heads varying from 1–5 inches of mercury. The number of seconds required to obtain two sets of 50 ml. of water each flowing from the test fixture were recorded. The first 50 ml. of each sample set was analyzed for hardness by the ethylene diamine tetraacetic acid (EDTA) method described in Standard Method for the Examination of Water & Waste Water, American Public Health Association, N. Y., 11th Ed. 1960, page 133. The second 50 ml. effluent sample was analyzed for chloride ion in accordance with the mercuric nitrate method described in the same source as the hardness method, page 79. The

TABLE III

| | Example 1 | Commercial "A" | Commercial "B" |
|---|---|---|---|
| Gallons of Water Filtered to Elution-Carbon Capacity. | 2,400 | 1,500 | 200. |
| Rated Flow | 1 gallon per minute | 0.5 gallon per minute | 0.5 gallon per minute. |
| Single Pass Initial Efficient | 99%, remains constant for first 2,000 gallons passed. | 99%, drops off within first 100 gals. passed. | 50%, drops off immediately. |

The actual test results are plotted on the graph shown in FIG. 4.

As shown by the foregoing test results, the filter medium of the invention provides for much more rapid flow of liquid through the filter and what is particularly desirable is the retention of the high flow rate over vastly longer periods of operation than is permitted by the two commercially available filters. Also of great significance in practical operation is highly effective purification obhardness is calculated in p.p.m. of hardness as calcium carbonate ($CaCO_3$) which is an indication of the presence of both the calcium and magnesium cations in the test water. The chloride determination is an indication of the presence of chloride anions in the test water. The presence of no hardness and chloride components in the effluent water indicates complete demineralization by the filter medium. The results of this test are given in Table IV below:

TABLE IV

| Air Pressure Head, inches mercury | Accumulative Test Effluent ml. | Seconds to obtain 50 ml. of water Effluent | Hardness, parts per million, $CaCO_3$ | Hardness Removal eff., Percent | Chloride, parts per million | Chloride Removal eff., Percent |
|---|---|---|---|---|---|---|
| 1.0 | 50 | 195 | 0 | 100 | | |
| 1.0 | 100 | 187 | | | 1 | 99 |
| 1.5 | 150 | 120 | 0 | 100 | | |
| 1.5 | 200 | 113 | | | 1 | 99 |
| 2.0 | 250 | 73 | 0 | 100 | | |
| 2.0 | 300 | 70 | | | 0 | 100 |
| 2.5 | 350 | 59 | 0 | 100 | | |
| 2.5 | 400 | 57 | | | 2 | 97 |
| 3.0 | 450 | 46 | 0 | 100 | | |
| 3.0 | 500 | 45 | | | 0 | 100 |
| 3.5 | 550 | 40 | 0 | 100 | | |
| 3.5 | 600 | 40 | | | 1 | 99 |
| 4.0 | 650 | 32 | 0 | 100 | | |
| 4.0 | 700 | 32 | | | 0 | 100 |
| 4.5 | 750 | 27 | 0 | 100 | | |
| 4.5 | 800 | 27 | | | 7 | 90 |
| 5.0 | 850 | 25 | 10 | 92 | | |
| 5.0 | 900 | 26 | | | 0 | 100 |

NOTE:—The test water had a hardness of 130 parts per million and a chloride content of 70 parts per million.

NOTE.—The test water had a hardness of 130 parts per million and a chloride content of 70 parts per million.

*Example 3*

Experimental filter media comprising plugs 1⅝" diameter 1 inch long were fabricated out of an intimate blend of 75 parts of finely-divided activated carbon (Darco G–60) of particle size smaller than 325 mesh and 25 parts of polyethylene encapsulated paper pulp of the same composition as described in Example 1. One portion of the mixture of polyethylene encapsulated paper pulp and activated carbon was molded at 300° F. for 45 minutes in a glass funnel test fixture previously coated with a Hycar adhesive. The other portion was loosely packed (without being subjected to the heat treatment) in the form of a plug the same size. Water was reservoir fed to the test fixture under air pressure heads of one and five inches of mercury. The number of seconds required to obtain two sets of 50 ml. of water each flowing from the test fixture were recorded at the beginning and after being used overnight. The results were as follows:

| Filter Plug | Pressure Head (inches of mercury) | Time Required in Seconds | |
|---|---|---|---|
| | | Beginning | After Overnight |
| (1) Heat Treated | 1 | 300–400 | 300–400 |
| | 5 | 40–60 | 40–60 |
| (2) Not Heat Treated | 1 | 1,900 | 4,900 |
| | 5 | 315 | |

As shown by the foregoing results, the sintered filter medium of the present invention permits more rapid flow than a filter medium of the same composition, but not sintered, and the sintered filter does not tend to compact during usage as shown by the fact that the flow rate is about the same after standing overnight.

As used herein, and in the appended claims, the term "adsorbent substance" is intended to refer and encompass adsorbents, ion exchangers, and filter aids, these being materials known for their ability to remove dissolved materials from fluids and which materials are substantially insoluble in the fluid being treated. The term "adsorbent" is a well recognized term, known even to the layman, and is used herein in its usual broad sense to connote a substance which takes up and holds another substance by adsorption, in accordance with Webster's Third International Dictionary. The same source of Webster defines "adsorption" as a taking up by physical or chemical forces of molecules of gas, dissolved substances, or of liquids by the surfaces of solids with which they are in contact. This is what is contemplated and encompassed by the present invention.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A filter medium comprising
   (A) a sintered mass of solids encased in thermoplastic polymer casings said encased solids being attached to each other by portions of their casings to form a semi-rigid matrix, and
   (B) finely divided particles of adsorbent material distributed throughout the mass and mechanically supported by the matrix between said polymer encased solids, said particles of adsorbent material being unencapsulated.

References Cited

UNITED STATES PATENTS

| | | |
|---|---|---|
| 3,019,127 | 1/1962 | Czerwonka et al. |
| 3,121,698 | 2/1964 | Orsino et al. _____ 260—2.5 |
| 3,165,470 | 1/1965 | Giesse et al. _____ 55—524 X |
| 3,212,641 | 10/1965 | Komarmy et al. ____ 210—504 X |

MURRAY KATZ, *Primary Examiner.*

LEON D. ROSDOL, *Examiner.*

I. GLUCK, *Assistant Examiner.*